United States Patent
Higaki et al.

(10) Patent No.: US 12,015,268 B2
(45) Date of Patent: Jun. 18, 2024

(54) DC POWER SUPPLY AND DISTRIBUTION SYSTEM

(71) Applicant: Mitsubishi Electric Corporation, Tokyo (JP)

(72) Inventors: Yusuke Higaki, Tokyo (JP); Kikuo Izumi, Tokyo (JP); Takushi Jimichi, Tokyo (JP); Tsuguhiro Takuno, Tokyo (JP); Takuya Kataoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 174 days.

(21) Appl. No.: 17/440,199

(22) PCT Filed: May 10, 2019

(86) PCT No.: PCT/JP2019/018750
§ 371 (c)(1),
(2) Date: Sep. 17, 2021

(87) PCT Pub. No.: WO2020/230191
PCT Pub. Date: Nov. 19, 2020

(65) Prior Publication Data
US 2022/0014018 A1    Jan. 13, 2022

(51) Int. Cl.
*H02J 1/10* (2006.01)

(52) U.S. Cl.
CPC .................. *H02J 1/102* (2013.01)

(58) Field of Classification Search
CPC ...... H02J 1/102; H02J 1/10; H02J 1/12; H02J 1/082; H02J 1/08; H02J 9/061
See application file for complete search history.

(56) References Cited

U.S. PATENT DOCUMENTS 5,917,250 A * 6/1999 Kakalec ............ H02J 1/10
307/64
2003/0218384 A1* 11/2003 Yoneda ............ H02J 1/102
307/19

(Continued)

FOREIGN PATENT DOCUMENTS

EP    3 886 283 A1    9/2021
EP    3886283 A1 *   9/2021    ............ H02J 1/08

(Continued)

OTHER PUBLICATIONS

Extended European Search Report dated Apr. 19, 2022, in European Application No. 19928413.4.

(Continued)

*Primary Examiner* — Rexford N Barnie
*Assistant Examiner* — Rasem Mourad
(74) *Attorney, Agent, or Firm* — XSENSUS LLP

(57) ABSTRACT

The present DC power supply and distribution system includes a plurality of distribution lines provided respectively corresponding to a plurality of loads, a first converter to convert an AC voltage from a commercial AC power source into a plurality of DC voltages and supply the DC voltages respectively to the distribution lines, a second converter to convert a DC power from a power generation and storage source into a plurality of DC powers and supply the DC powers respectively to the distribution lines, and a power controller to control the DC powers such that the efficiency of the first converter is increased, based on information related to the efficiency of the second converter.

16 Claims, 16 Drawing Sheets

(56) References Cited

U.S. PATENT DOCUMENTS

| | | | | |
|---|---|---|---|---|
| 2011/0280597 | A1* | 11/2011 | Shimura | G03G 15/2039 |
| | | | | 399/37 |
| 2012/0239214 | A1* | 9/2012 | Nakashima | H02J 7/34 |
| | | | | 700/286 |
| 2017/0358929 | A1* | 12/2017 | Koeppe | H02J 1/08 |
| 2018/0222413 | A1* | 8/2018 | Aoki | H02J 1/06 |
| 2019/0045596 | A1* | 2/2019 | Zhang | H05B 45/37 |
| 2020/0301460 | A1* | 9/2020 | Mitsutani | G05F 1/66 |
| 2021/0194275 | A1* | 6/2021 | Lee | H02J 9/062 |

FOREIGN PATENT DOCUMENTS

| | | | |
|---|---|---|---|
| JP | 2010-57231 A | | 3/2010 |
| JP | 2014-64450 A | | 4/2014 |
| JP | 2015-163033 A | | 9/2015 |
| JP | 2015163033 A | * | 9/2015 |
| JP | 2016-63626 A | | 4/2016 |

OTHER PUBLICATIONS

International Search Report and Written Opinion dated Jul. 23, 2019, received for PCT Application PCT/JP2019/018750, Filed on May 10, 2019, 7 pages including English Translation.

* cited by examiner

FIG.16

|  | COMPARATIVE EXAMPLE 1 | COMPARATIVE EXAMPLE 2 | COMPARATIVE EXAMPLE 3 |
| --- | --- | --- | --- |
| MAIN POWER PATH | THREE STAGES | TWO STAGES | TWO STAGES |
| SUB-POWER PATH | THREE STAGES | TWO STAGES | FOUR STAGES |

DC POWER SUPPLY AND DISTRIBUTION SYSTEM

CROSS-REFERENCE TO RELATED APPLICATION

The present application is based on PCT filing PCT/JP2019/018750, filed May 10, 2019, the entire contents of which are incorporated herein by reference.

TECHNICAL FIELD

The present disclosure relates to a DC power supply and distribution system.

BACKGROUND ART

For example, Japanese Patent Laying-Open No. 2010-057231 (PTL 1) discloses a DC/DC converter that detects power consumption of a load having a plurality of states, detects a state of the load based on the detected power consumption, and supplies a power supply voltage optimum for the state to the load.

For example, Japanese Patent Laying-Open No. 2015-163033 (PTL 2) discloses a DC power supply device including a plurality of DC/DC converters that convert a DC power supplied from a DC power source device into a plurality of DC powers and supply the DC powers to respective loads. When a power saving request is made to specify a peak cut of the power consumption amount, supply of DC power to a load with less power consumption is stopped and DC power is preferentially supplied to a load with much power consumption.

CITATION LIST

Patent Literature

PTL 1: Japanese Patent Laying-Open No. 2010-057231
PTL 2: Japanese Patent Laying-Open No. 2015-163033

SUMMARY OF INVENTION

Technical Problem

PTL 1 determines a power supply voltage for a load in accordance with consumption current of the load but does not consider a loss from the DC/DC converter that generates a power supply voltage. The efficiency of the system as a whole therefore may be deteriorated.

PTL 2 supplies DC power preferentially to a load with much power consumption but does not consider the efficiency of the system as a whole.

A main object of the present disclosure is therefore to provide a DC power supply and distribution system with high efficiency.

Solution to Problem

A DC power supply and distribution system according to the present disclosure includes a plurality of distribution lines, a first converter, a second converter, a first detector, and a first controller. The distribution lines are provided respectively corresponding to a plurality of loads. The first converter converts a voltage supplied from a first power source to a plurality of DC voltages respectively corresponding to the loads and supplies the DC voltages respectively to the distribution lines. The second converter converts a power supplied from a second power source into a plurality of DC powers respectively corresponding to the loads and supplies the DC powers respectively to the distribution lines. The first controller controls the DC powers such that efficiency of the first converter is increased, based on information related to efficiency of the second converter.

Advantageous Effects of Invention

In this DC power supply and distribution system, a plurality of DC powers are controlled such that the efficiency of the first converter is increased, so that the efficiency of the system as a whole can be increased.

BRIEF DESCRIPTION OF DRAWINGS

FIG. 16 is a table for comparing the number of converter stages in Comparative Examples 1 to 3.

DESCRIPTION OF EMBODIMENTS

First Embodiment

Figure 1:
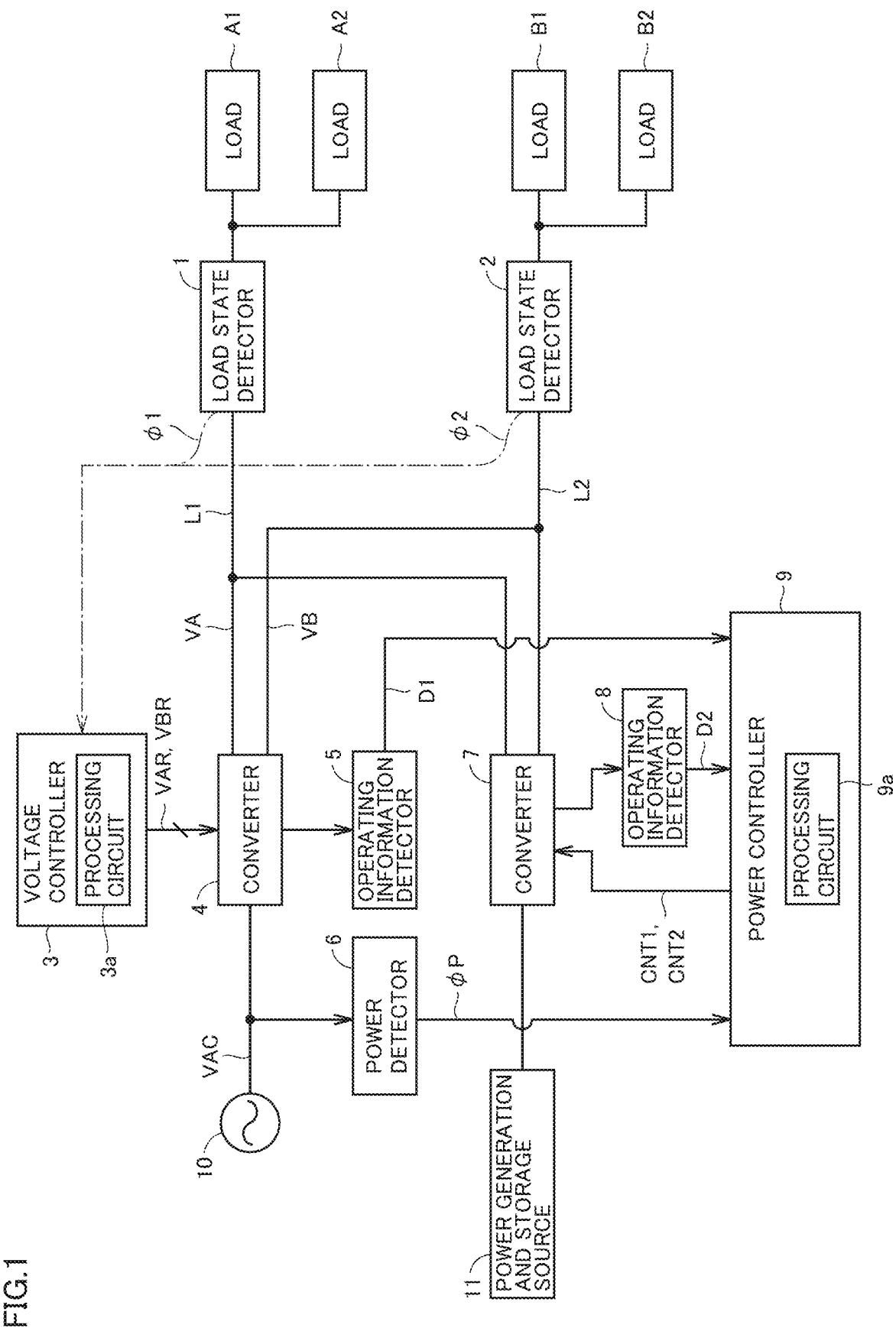
FIG. 1 is a block diagram showing a configuration of a DC power supply and distribution system according to a first embodiment.

FIG. 1 is a block diagram showing a configuration of a DC power supply and distribution system according to a first embodiment. In FIG. 1, this DC power supply and distribution system includes a plurality of (in this example, two) distribution lines L1 and L2, load state detectors 1 and 2, a voltage controller 3, converters 4 and 7, operating information detectors 5 and 8, a power detector 6, and a power controller 9.

In general, loads are classified into general power system loads such as air conditioners and elevators, factory power system loads such as conveyors and presses in factories, lighting loads, and general loads such as business machines. In these loads, their daily electricity usage characteristics and optimum operating voltage for each operating state differ from each other. Therefore, the efficiency is improved more easily by supplying a voltage unique to each individual load, rather than by supplying the same voltage to these loads.

Since there is a large difference in operating characteristics at least between the power loads including general power loads and factory power loads, and the other loads (lighting loads and general loads), the efficiency can be improved more easily by setting different values for a voltage supplied to the power loads and a voltage supplied to the other loads.

Then, in the present first embodiment, the loads are divided into a group A (for example, the power loads) and a group B (for example, the other loads), and distribution line L1 for supplying a DC voltage VA to a plurality of (in this example, two) loads A1 and A2 belonging to group A and distribution line L2 for supplying a DC voltage VB to a plurality of (in this example, two) loads B1 and B2 belonging to group B are separately provided. Loads A1 and A2 in group A are connected to distribution line L1, and loads B1 and B2 in group B are connected to distribution line L2.

Although an electric wire on the positive electrode side and an electric wire on the negative electrode side are necessary to supply DC voltage, FIG. 1 shows only one distribution line for supplying one DC voltage, for simplicity of the drawings and description.

Changing each of DC voltages VA and VB according to a state (load factor, current consumption, power consumption, etc.) of a load increases the efficiency of the load and reduces power consumption (or current consumption), rather than fixing each of DC voltages VA and VB to a certain voltage. Load state detector 1 is coupled to distribution line L1, and detects a state (for example, load factor) of loads A1 and A2 in group A and applies a signal $\phi 1$ indicating the detection value to voltage controller 3. Load state detector 2 is coupled to distribution line L2, and detects a state (for example, load factor) of loads B1 and B2 in group B and applies a signal $\phi 2$ indicating the detection value to voltage controller 3.

Voltage controller 3 controls a reference voltage VAR such that power consumption (or current consumption) of loads A1 and A2 in group A decreases, based on signal $\phi 1$ from load state detector 1, and sets reference voltage VAR to an optimum value. Voltage controller 3 also controls a reference voltage VBR such that power consumption (or current consumption) of loads B1 and B2 in group B decreases, based on signal $\phi 2$ from load state detector 2, and sets reference voltage VBR to an optimum value.

The function of voltage controller 3 can be implemented using a processing circuit 3a. As used herein processing circuit 3a refers to dedicated hardware such as a dedicated processing circuit, or a processor and a storage device. When dedicate hardware is used, the dedicated processing circuit corresponds to a single circuit, a composite circuit, a programmed processor, a parallel programmed processor, an application-specific integrated circuit (ASIC), a field programmable gate array (FPGA), or a combination thereof.

When a processor and a storage device is used, the functions above are implemented by software, firmware, or a combination thereof. Software or firmware is written as programs and stored in a storage device. The processor reads and executes the programs stored in the storage device. It can be said that these programs cause a computer to execute a procedure and a method that implement the functions above.

The storage device corresponds to a semiconductor memory such as a random-access memory (RAM), a read only memory (ROM), a flash memory, an erasable programmable read only memory (EPROM), or an electrically erasable programmable read only memory (EEPROM) (registered trademark). The semiconductor memory may be a nonvolatile memory or a volatile memory. The storage device corresponds to, in addition to semiconductor memories, a magnetic disc, a flexible disc, an optical disc, a compact disc, a mini disc, or a digital versatile disc (DVD).

Converter 4 (first converter) converts an AC voltage VAC supplied from a commercial AC power source 10 as a main power source (first power source) into DC voltages VA and VB respectively having the same values as reference voltages VAR and VBR and supplies these DC voltages VA and VB respectively to distribution lines L1 and L2. Operating information detector 5 detects information D1 related to the efficiency $\eta 1$ of converter 4 and applies the detected information D1 to power controller 9.

A DC power source may be provided as the main power source instead of commercial AC power source 10. In this case, converter 4 converts a DC voltage supplied from the DC power source into DC voltages VA and VB respectively having the same values as reference voltages VAR and VBR.

Figure 2:
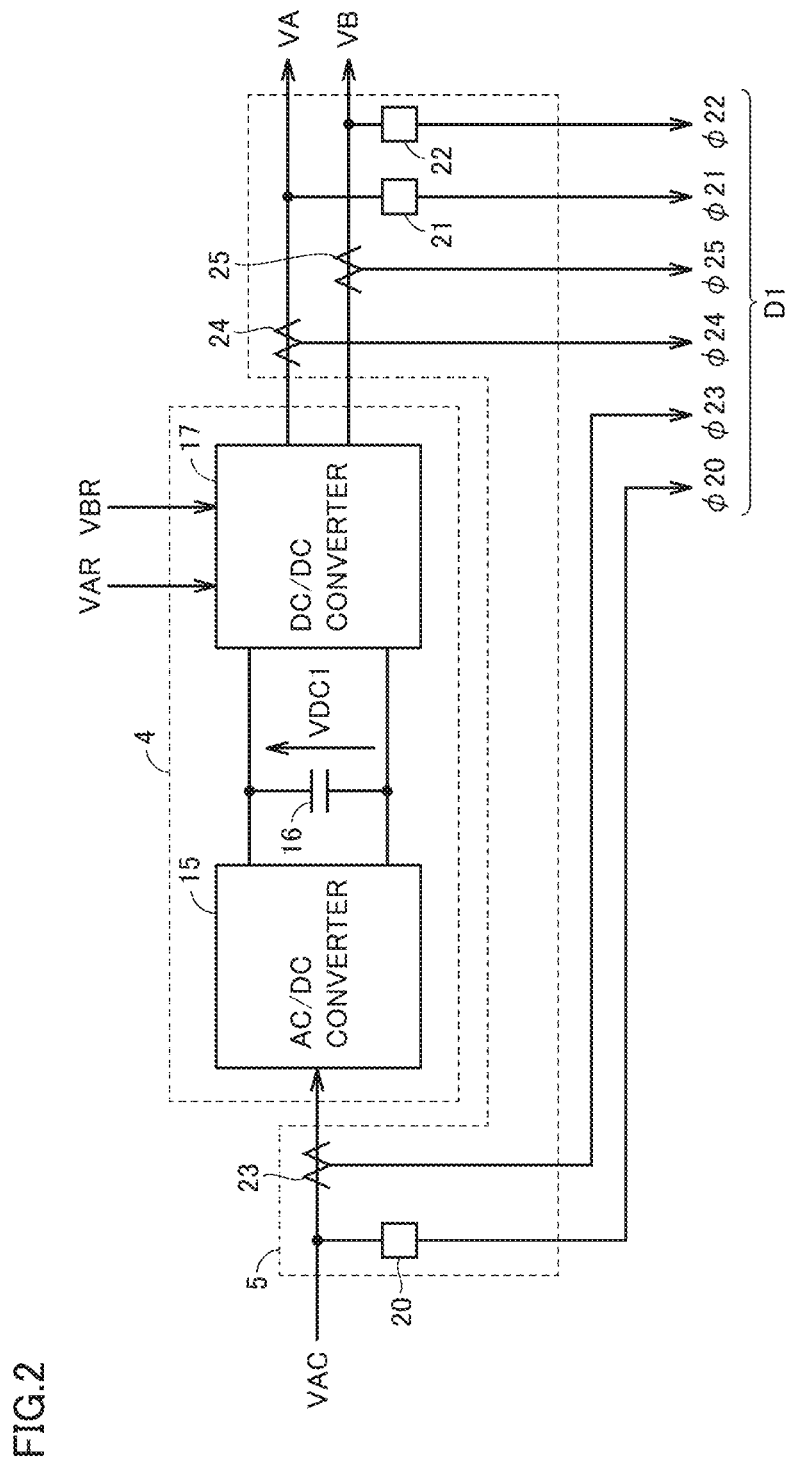
FIG. 2 is a circuit block diagram showing a configuration of a converter 4 and an operating information detector 5 shown in FIG. 1.

FIG. 2 is a circuit block diagram showing a configuration of converter 4 and operating information detector 5. In FIG. 2, converter 4 includes an AC/DC converter 15, a capacitor 16, and a DC/DC converter 17. AC/DC converter 15 converts three-phase AC voltage VAC supplied from commercial AC power source 10 into a DC voltage VDC1. Capacitor 16 stabilizes and smooths DC voltage VDC1. DC/DC converter 17 converts DC voltage VDC1 into DC voltage VA having the same value as reference voltage VAR and converts DC voltage VDC1 into DC voltage VB having the same value as reference voltage VBR.

DC/DC converter 17 includes, for example, first and second voltage followers. The first voltage follower is driven by DC voltage VDC1 and outputs DC voltage VA having the same value as reference voltage VAR to distribution line L1. The second voltage follower is driven by DC voltage VDC1 and outputs DC voltage VB having the same value as reference voltage VBR to distribution line L2. For example, DC voltage VDC1 is a voltage higher than DC voltages VA and VB.

Operating information detector 5 includes voltage detectors 20 to 22 and current detectors 23 to 25. Voltage detector 20 detects an instantaneous value of AC voltage VAC supplied from commercial AC power source 10 and outputs a signal $\phi 20$ indicating the detection value. Voltage detector 21 detects output DC voltage VA of DC/DC converter 17 and outputs a signal $\phi 21$ indicating the detection value. Voltage detector 22 detects output DC voltage VB of DC/DC converter 17 and outputs a signal $\phi 22$ indicating the detection value.

Current detector 23 detects an instantaneous value of AC current IAC flowing from commercial AC power source 10 into AC/DC converter 15 and outputs a signal $\phi 23$ indicating the detection value. Current detector 24 detects a DC current IA flowing from DC/DC converter 17 through distribution line L1 and outputs a signal $\phi 24$ indicating the detection value. Current detector 25 detects a DC current IB flowing from DC/DC converter 17 through distribution line L2 and outputs a signal φ25 indicating the detection value. Signals φ20 to φ25 are applied to power controller 9 as information D1 related to the efficiency η1 of converter 4.

When commercial AC power source 10 is stable, a setting value based on the rated voltage of commercial AC power source 10 may be used instead of output signal φ20 from voltage detector 20. Furthermore, reference voltages VAR and VBR may be used instead of output signals φ21 and φ22 from voltage detectors 21 and 22. In this case, the configuration of operating information detector 5 can be simplified.

Returning to FIG. 1, power detector 6 detects AC power P supplied from commercial AC power source 10 to converter 4 and applies a signal φP indicating the detection value to power controller 9. Power detector 6 detects an instantaneous value of AC voltage VAC supplied from commercial AC power source 10 and an instantaneous value of AC current IAC flowing from commercial AC power source 10 into converter 4 and determines an AC power based on these detection values.

Power detector 6, for example, determines an effective value VACe of AC voltage VAC, an effective value IACe of AC current IAC, and a phase difference θ of AC voltage VAC and AC current IAC, based on the detection values of AC voltage VAC and AC current IAC, and determines AC power P=VACe×IACe×cos θ from these values.

Converter 7 (second converter) is controlled by control signals CNT1 and CNT2 supplied from power controller 9, converts a DC power supplied from a power generation and storage source 11 as a sub-power source (second power source) into two DC powers P1 and P2, and supplies these DC powers P1 and P2 respectively to distribution lines L1 and L2. Operating information detector 8 detects information D2 related to the efficiency η2 of converter 7 and applies the detected information D2 to power controller 9.

Figure 3:
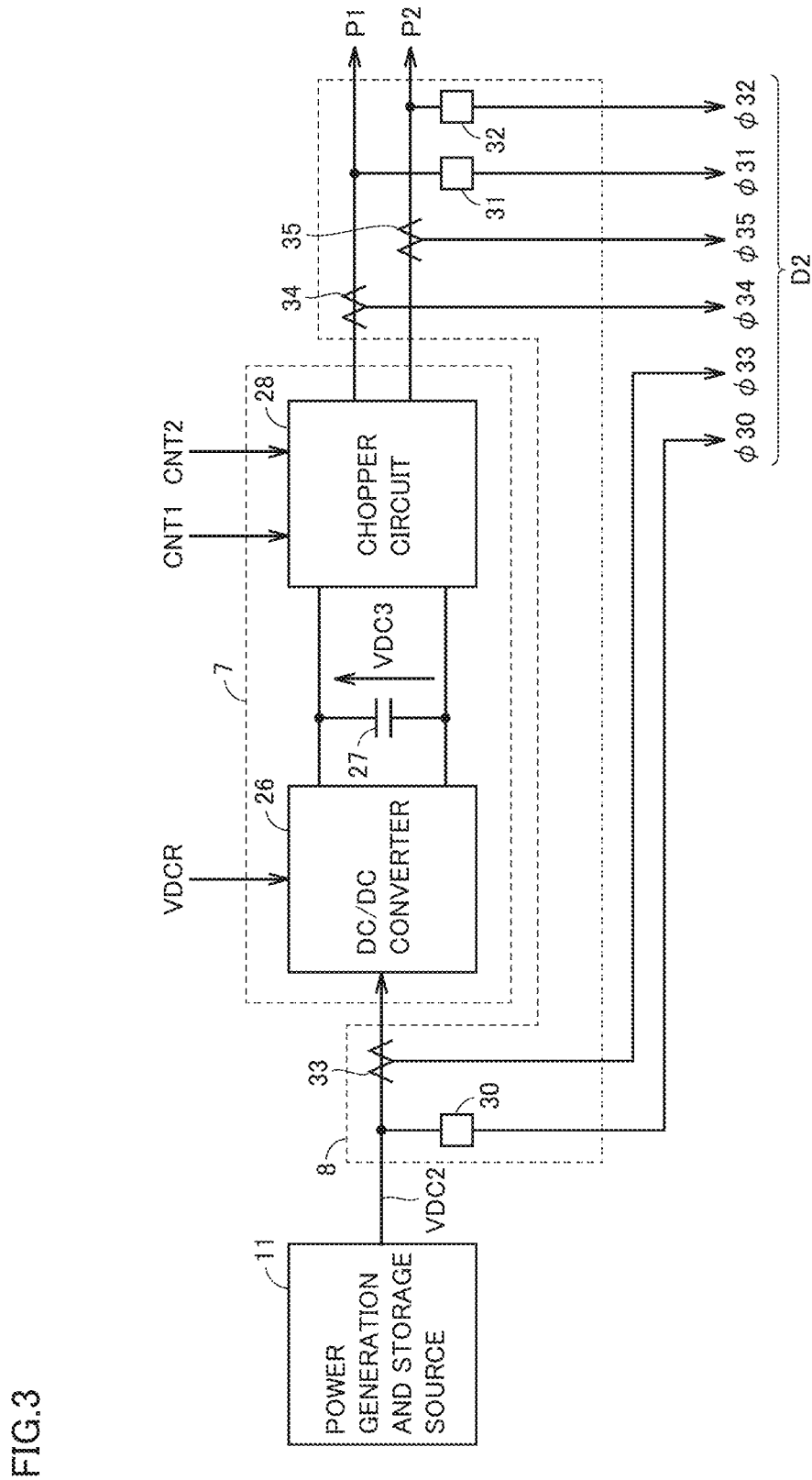
FIG. 3 is a circuit block diagram showing a configuration of a converter 7 and an operating information detector 8 shown in FIG. 1.

FIG. 3 is a circuit block diagram showing a configuration of converter 7 and operating information detector 8. In FIG. 3, converter 7 includes a DC/DC converter 26, a capacitor 27, and a chopper circuit 28. DC/DC converter 26 converts a DC voltage VDC2 supplied from power generation and storage source 11 into a DC voltage VDC3 having the same value as a reference voltage VDCR supplied from power controller 9.

Power generation and storage source 11 is a power generation device generating DC power, or a battery storing DC power, or a combination thereof, and outputs DC power. Examples of the power generation device include solar cells, wind power generators, tidal power generators, geothermal power generators, and fuel cells. Examples of the battery include lead-acid batteries, lithium-ion batteries, and those mounted on automobiles. Capacitor 27 stabilizes and smooths DC voltage VDC3.

Chopper circuit 28 converts a DC power supplied from DC/DC converter 26 into DC powers P1 and P2 in accordance with control signals CNT1 and CNT2 applied from power controller 9 and supplies DC powers P1 and P2 respectively to distribution lines L1 and L2.

Chopper circuit 28 includes, for example, first and second choppers. Each of control signals CNT1 and CNT2 is, for example, a pulse width modulation (PWM) signal. For example, DC voltage VDC3 is a voltage higher than DC voltages VA and VB. The first chopper converts DC voltage VDC3 supplied from DC/DC converter 26 into a first pulse voltage sequence and supplies the first pulse voltage sequence to distribution line L1 through an internal reactor in accordance with control signal CNT1 that is a pulse signal sequence, thereby to output DC power P1 to distribution line L1. When the duty ratio of control signal CNT1 increases or decreases, DC power P1 also increases or decreases.

The second chopper converts DC voltage VDC3 supplied from DC/DC converter 26 into a second pulse voltage sequence and supplies the second pulse voltage sequence to distribution line L2 through an internal reactor in accordance with control signal CNT2 that is a pulse signal sequence, thereby to output DC power P2 to distribution line L2. When the duty ratio of control signal CNT2 increases or decreases, DC power P2 also increases or decreases.

When power generation and storage source 11 is a battery, DC power supplied from converter 4 and regenerative power supplied from a load can be stored into power generation and storage source 11. In this case, chopper circuit 28 converts DC voltages VA and VB supplied from converter 4 and the load through distribution lines L1 and L2 into DC voltage VDC3. DC/DC converter 26 stores DC power supplied from chopper circuit 28 into power generation and storage source 11.

Operating information detector 8 includes voltage detectors 30 to 32 and current detectors 33 to 35. Voltage detector 30 detects DC voltage VDC2 supplied from power generation and storage source 11 and outputs a signal φ30 indicating the detection value. Voltage detector 31 detects output DC voltage VA from chopper circuit 28 and outputs a signal φ31 indicating the detection value. Voltage detector 32 detects output DC voltage VB from chopper circuit 28 and outputs a signal φ32 indicating the detection value.

Current detector 33 detects a DC current IDC2 flowing from power generation and storage source 11 into DC/DC converter 26 and outputs a signal φ33 indicating the detection value. Current detector 34 detects a DC current I1 flowing from chopper circuit 28 through distribution line L1 and outputs a signal φ34 indicating the detection value. Current detector 35 detects a DC current I2 flowing from chopper circuit 28 through distribution line L2 and outputs a signal φ35 indicating the detection value. Signals φ30 to φ35 are applied as information D2 related to the efficiency η2 of converter 7 to power controller 9.

When power generation and storage source 11 is stable, a setting value based on the rated voltage of power generation and storage source 11 may be used instead of output signal φ30 from voltage detector 30.

Power controller 9 controls output powers P1 and P2 of converter 7 such that the efficiency η of converters 4 and 7 is maximized, based on information D1 and D2 from operating information detectors 5 and 8 and signal φP from power detector 6. The function of power controller 9 can be implemented using a processing circuit 9a. Processing circuit 9a is the same as processing circuit 3a. Voltage controller 3 and power controller 9 may be configured with one processing circuit.

Figure 4:
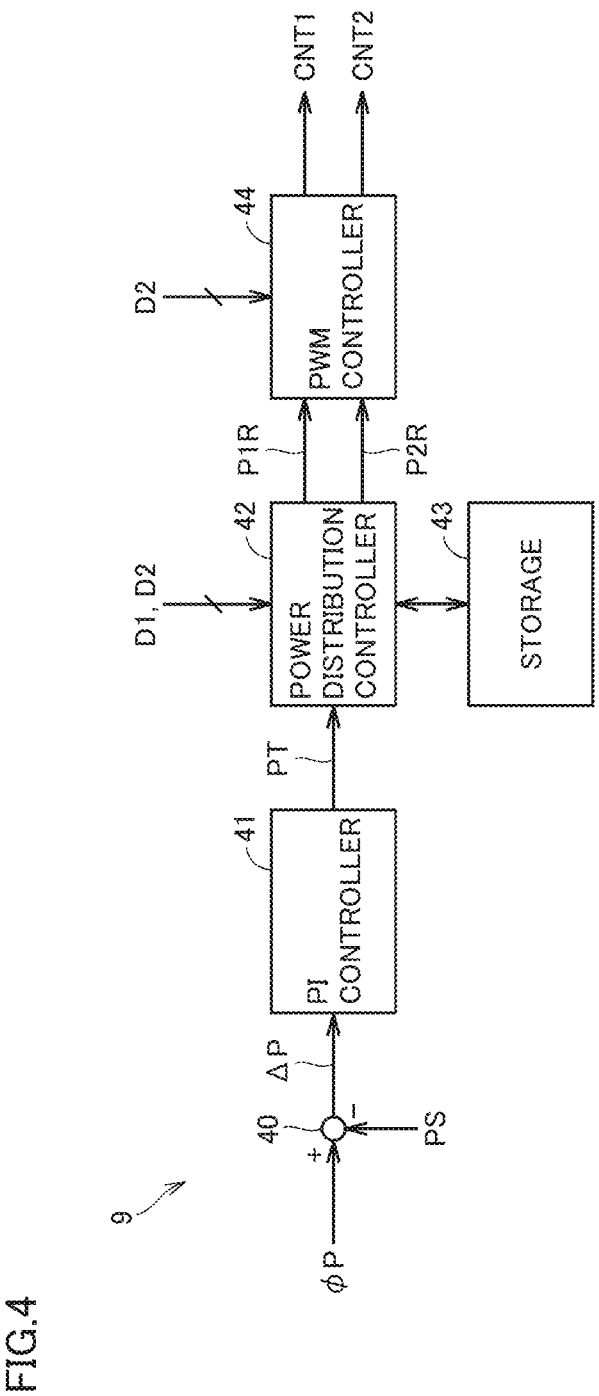
FIG. 4 is a circuit block diagram showing a configuration of a power controller shown in FIG. 1.

FIG. 4 is a block diagram showing the main part of power controller 9. In FIG. 4, power controller 9 includes a subtractor 40, a proportional integral (PI) controller 41, a power distribution controller 42, a storage 43, and a PWM controller 44.

The basic function of this DC power supply and distribution system is to supply AC voltage from commercial AC power source 10 into DC voltages VA and VB and supply DC voltages VA and VB to loads A1, A2, B1, and B2, and its additional function is to suppress the effect of loads A1, A2, B1, and B2 on commercial AC power source 10. The basic use method of power generation and storage source 11 is therefore to charge and discharge power generation and storage source 11 such that AC power P supplied from commercial AC power source 10 attains a desired setting value PS or smaller.

The desired setting value PS is an upper limit value or a target value of receiving power set by a request from a user or a remote controller performing energy management. The desired setting value PS is called purchase power setting value. In this DC power supply and distribution system, an output power target value PT is generated such that AC power P supplied from commercial AC power source 10 attains purchase power setting value PS or smaller at the present time or the previous time.

Subtractor 40 therefore determines a deviation $\Delta P=\phi P-PS$ between output signal $\phi P$ of power detector 6 (that is, the detection value of AC power P supplied from commercial AC power source 10) and purchase power setting value PS. PI controller 41 performs PI control on deviation $\Delta P$ to generate output power target value PT.

Output power target value PT is a value corresponding to the sum (P1+P2) of DC powers P1 and P2 supplied from converter 7 to distribution lines L1 and L2. When receiving power P exceeds purchase power setting value PS, output power target value PT of positive polarity can be obtained. When output power target value PT has positive polarity, DC power is supplied from power generation and storage source 11 to loads A1, A2, B1, and B2 through converter 7. Although not shown, upper and lower limiters may be added to output power target value PT to suppress charge or discharge of power generation and storage source 11, if necessary.

Power distribution controller 42 determines the efficiency $\eta$ of converters 4 and 7 based on information D1 (that is, signals $\phi 20$ to $\phi 25$) and information D2 (that is, signals $\phi 30$ to $\phi 35$) supplied from operating information detectors 5 and 8, and generates reference powers P1R and P2R such that the efficiency $\eta$ is maximized. It is noted that P1R+P2R=PT.

Power distribution controller 42 determines the efficiency $\eta$ of converters 4 and 7, for example, in the following manner. Power distribution controller 42 determines effective value VACr of AC voltage VAC based on output signal $\phi 20$ from voltage detector 20 (FIG. 2), determines effective value IACr of AC current IAC based on output signal $\phi 23$ from current detector 23 (FIG. 2), determines phase difference $\theta$ between AC voltage VAC and AC current IAC based on signals $\phi 20$ and $\phi 23$, and determines power PI1=VACr×IACr×cos $\theta$ supplied from commercial AC power source 10 to converter 4.

Furthermore, power distribution controller 42 determines output power PO1=VA×IA+VB×IB of converter 4, based on output signals $\phi 21$ and $\phi 22$ from voltage detectors 21 and 22 (FIG. 2) and output signals $\phi 24$ and $\phi 25$ from current detectors 24 and 25 (FIG. 2).

Furthermore, power distribution controller 42 determines power PI2=VDC2×IDC2 supplied from power generation and storage source 11 to converter 7, based on output signal $\phi 30$ from voltage detector 30 (FIG. 3) and output signals $\phi 30$ and $\phi 33$ from current detector 33 (FIG. 3).

Furthermore, power distribution controller 42 determines output power P1=VA×I1 of converter 7, based on output signal $\phi 31$ from voltage detector 31 (FIG. 3) and output signal $\phi 34$ from current detector 34 (FIG. 3). Furthermore, power distribution controller 42 determines output power P2=VB×I2 of converter 7, based on output signal $\phi 32$ from voltage detector 32 (FIG. 3) and output signal $\phi 35$ from current detector 35 (FIG. 3). Power distribution controller 42 then determines the efficiency $\eta=(PO1+P1+P2)/(PI1+PI2)$ of converters 4 and 7, based on PI1, PO1, PI2, P1, and P2 above.

Figure 5:
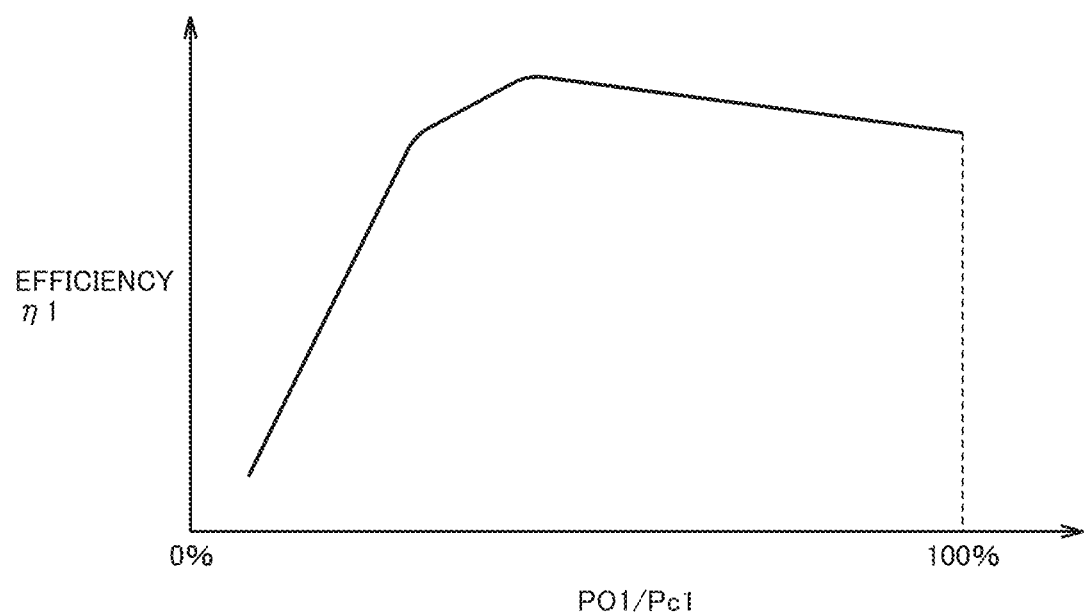
FIG. 5 is a diagram showing the efficiency of converter 4 shown in FIG. 1.

FIG. 5 is a diagram showing the efficiency $\eta 1$ of converter 4. In FIG. 5, the horizontal axis shows a ratio PO1/Pc1 (%) of output power PO1 of converter 4 to a rated power Pc1, and the vertical axis shows the efficiency $\eta 1$. The efficiency $\eta 1$ changes in accordance with the value of PO1/Pc1 and reaches a peak value when PO1/Pc1 is a certain value. The efficiency $\eta 1$ gradually decreases as PO1/Pc1 increases from a certain value. The efficiency $\eta 1$ rapidly decreases as PO1/Pc1 decreases from a certain value.

The efficiency $\eta 2$ of converter 7 also changes in the same manner as the efficiency $\eta 1$ of converter 4. When output powers P1 and P2 of converter 7 are changed, the efficiency $\eta 2$ of converter 7 changes, and output power PO1 of converter 4 also changes and the efficiency $\eta 1$ of converter 4 also changes.

Figure 6:
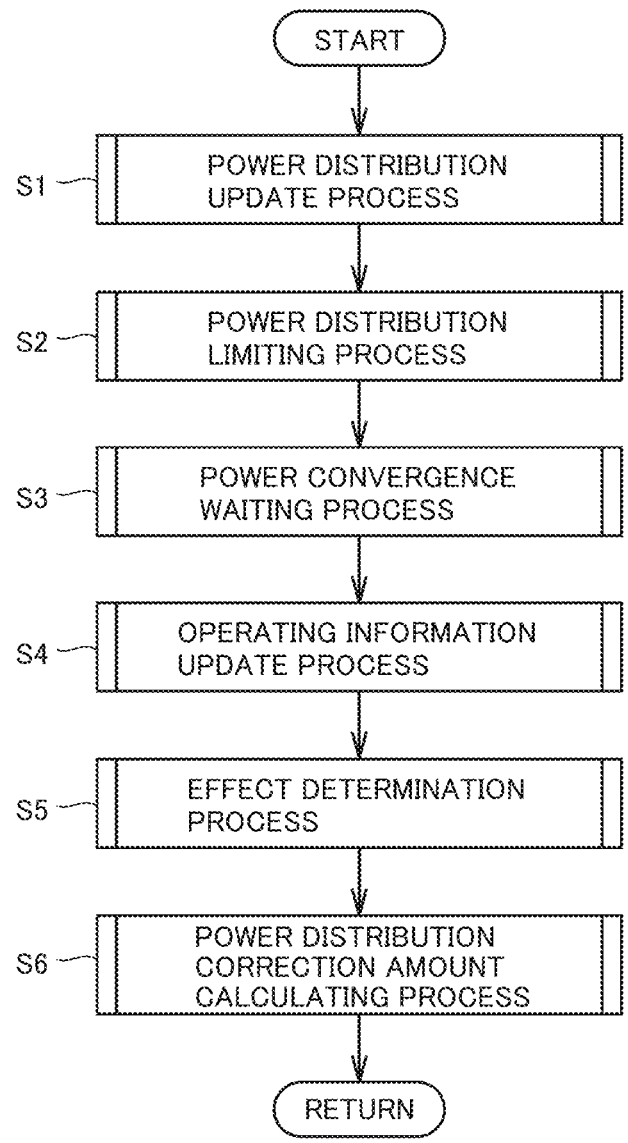
FIG. 6 is a flowchart showing the operation of a power distribution controller shown in FIG. 4.

FIG. 6 is a flowchart showing the operation of power distribution controller 42. At step S1 in FIG. 6, power distribution controller 42 performs a power distribution update process. In the power distribution update process, power distribution controller 42 adds a power distribution correction amount $\Delta R$ to the previous power distribution ratio RAn for distribution line L1 to determine the power distribution ratio this time RA(n+1)=RAn+$\Delta R$, and determines the power distribution ratio this time RB(n+1)=1−RA(n+1) for distribution line L2.

At step S2, power distribution controller 42 performs a power distribution limiting process. Respective upper limit values P1max and P2max are set for DC powers P1 and P2 output to distribution lines L1 and L2, depending on the rated power of hardware such as circuit parts that constitute converter 7.

Therefore, when DC power corresponding to output power target value PT is distributed to distribution lines L1 and L2, output powers P1 and P2 allocated to distribution lines L1 and L2 are limited in a range that does not exceed the respective upper limit values P1max and P2max. In the power distribution limiting process (S2), therefore, limit values RAmax and RBmax of power distribution ratios RA(n+1) and RB(n+1) are calculated such that output powers P1 and P2 respectively do not exceed upper limit values P1max and P2max after update of power distribution.

Figure 7:
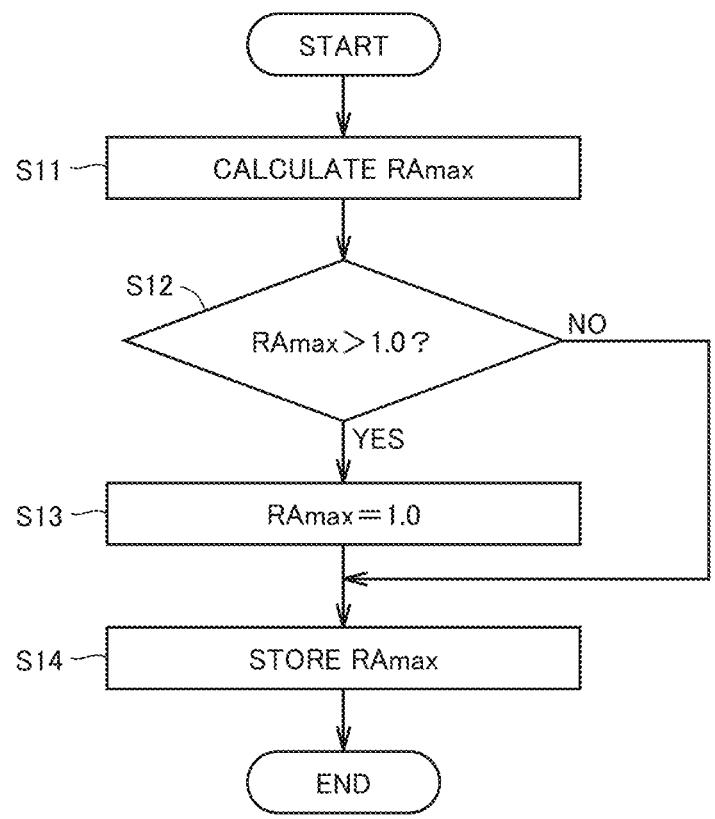
FIG. 7 is a flowchart showing a power distribution limiting process shown in FIG. 6.

FIG. 7 is a flowchart showing a method of calculating limit value RAmax of power distribution ratio RA(n+1). At step S11 in FIG. 7, power distribution controller 42 divides a rated power PcA of a portion corresponding to distribution line L1 of converter 7 by the absolute value |PT| of output power target value PT to calculate limit value RAmax=PcA/|PT|.

At step S12, power distribution controller 42 determines whether limit value RAmax is greater than 1.0. If RAmax>1.0, power distribution controller 42 sets RAmax=1.0 at step S13 and stores RAmax=1.0 at step S14. If not RAmax>1.0, at step S14, power distribution controller 42 stores RAmax calculated at step S11.

Limit value RBmax of power distribution ratio RB(n+1) is calculated by the same method as that of limit value RAmax of power distribution ratio RA(n+1). However, when the maximum value of output power target value PT agrees with the maximum value of the sum P1+P2 of output powers P1 and P2 corresponding to distribution lines L1 and L2, RBmax=1−RAmax and thus RBmax can be easily determined.

In the power distribution limiting process (S2), power distribution controller 42 limits power distribution ratios RA(n+1) and RB(n+1) to limit values RAmax and RBmax or smaller, respectively. As a result, output powers P1 and P2 of converter 7 are respectively limited to upper limit values P1max and P2max or smaller. If P1>P1max and P2<P2max, power distribution controller 42 increases P2 by the amount of power (P1−P1max). If P1<P1max and P2>P2max, power distribution controller 42 increases P1 by the amount of power (P2−P2max).

Power distribution controller 42 multiplies output power target value PT by power distribution ratio RA(n+1) to determine reference power P1R=PT×RA(n+1) and also multiplies output power target value PT by power distribution ratio RB(n+1) to determine reference power P2R=PT×RB(n+1).

Returning to FIG. 6, at step S3, power distribution controller 42 performs a power convergence waiting process. When the power distribution limiting process (S2) is performed, DC powers P1 and P2 supplied from converter 7 to distribution lines L1 and L2 change. However, when power distribution ratios RA and RB do not change, output powers P1 and P2 do not change. Output powers P1 and P2 of converter 7 do not instantaneously change but change with a certain time constant.

In the power convergence waiting process (S3), therefore, power distribution controller 42 waits until output powers P1 and P2 of converter 7 settle to a certain value. In this case, the time may be measured with a timer and power distribution controller 42 may wait until the setting time passes, or powers P1 and P2 may be detected with a power detector and power distribution controller 42 may wait until the detection values become constant. After output powers P1 and P2 settle, the process proceeds to the next process. When output powers P1 and P2 converge to a certain value but it is not determined that the settlement is completed, for example, a timeout process may be performed, and the settlement may be considered to be completed.

At step S4, power distribution controller 42 performs an operating information update process. In this process, power distribution controller 42 acquires operating information D1 and D2 of converters 4 and 7 from operating information detectors 5 and 8 and stores operating information D1 and D2 into storage 43, and in addition, determines the efficiency η(n+1) of converters 4 and 7 based on the operating information D1 and D2 and stores the determined efficiency η(n+1) into storage 43. In doing so, power distribution controller 42 stores the operating information D1 and D2 and the efficiency η(n+1) this time at an address different from that of the previous operating information D1 and D2 and efficiency ηn already stored.

At step S5, power distribution controller 42 performs an effect determination process. In this process, power distribution controller 42 compares the previous efficiency ηn with the efficiency η(n+1) this time stored in storage 43 and determines whether the efficiency η has increased [η(n+1)>ηn], whether the efficiency η has changed [η(n+1)=ηn], and whether the efficiency has decreased [η(n+1)<ηn].

At step S6, power distribution controller 42 performs a power distribution correction amount calculating process. In this process, if the efficiency η has increased [η(n+1)>ηn] and the efficiency has not changed [η(n+1)=ηn], power distribution controller 42 sets the power distribution correction amount ΔRn before update as it is as the power distribution correction amount ΔR after update. The process then returns to step S1.

Furthermore, if the efficiency η has decreased [η(n+1)<ηn], power distribution controller 42 reverses the polarity of the power distribution correction amount ΔR before update to generate the power distribution correction amount ΔR after update. The process then returns to step S1. By repeatedly performing steps S1 to S6, reference powers P1R and P2R can be generated such that the efficiency η of converters 4 and 8 is maximized.

Returning to FIG. 4, PWM controller 44 determines output power P1=VA×I1 of converter 7, based on output signal ϕ31 from voltage detector 31 (FIG. 3) and output signal ϕ34 from current detector 34 (FIG. 3) included in operating information D2. PWM controller 44 then controls the duty ratio of control signal CNT1 such that output power P1 of converter 7 attains reference power P1R.

Furthermore, PWM controller 44 determines output power P2=VB×I2 of converter 7, based on output signal ϕ32 from voltage detector 32 (FIG. 3) and output signal ϕ35 from current detector 35 (FIG. 3) included in operating information D2. PWM controller 44 then controls the duty ratio of control signal CNT2 such that output power P2 of converter 7 attains reference power P2R.

The operation of the DC power supply and distribution system shown in FIG. 1 to FIG. 7 will now be described. In this DC power supply and distribution system, a plurality of loads are divided into group A and group B. Loads A1 and A2 in group A are connected to distribution line L1, and loads B1 and B2 in group B are connected to distribution line L2.

A state (for example, load factor) of loads A1 and A2 is detected by load state detector 1, and optimum reference voltage VAR is generated by voltage controller 3 based on the detection results such that power consumption (or current consumption) of loads A1 and A2 is minimized.

Furthermore, a state (for example, load factor) of loads B1 and B2 is detected by load state detector 2, and optimum reference voltage VBR is generated by voltage controller 3 based on the detection results such that power consumption (or current consumption) of loads B1 and B2 is minimized.

AC voltage VAC supplied from commercial AC power source 10 is converted by converter 4 into DC voltage VA having the same value as reference voltage VAR, and DC voltage VA is supplied to distribution line L1. AC voltage VAC is also converted by converter 4 into DC voltage VB having the same value as reference voltage VBR, and DC voltage VB is supplied to distribution line L2.

AC power P supplied from commercial AC power source 10 to converter 4 is detected by power detector 6, information D1 related to the efficiency of converter 4 is detected by operating information detector 5, and information D2 related to the efficiency of converter 7 is detected by operating information detector 8.

Reference powers P1R and P2R are generated by power distribution controller 42, based on the detection results of power detector 6 and operating information detectors 5 and 8, such that AC power P attains purchase power setting value PS or smaller and the efficiency of converters 4 and 7 is maximized.

DC power supplied from power generation and storage source 11 is converted by converter 7 into DC power P1 having the same value as reference power P1R, and DC power P1 is supplied to distribution line L1. The DC power is also converted by converter 7 into DC power P2 having the same value as reference power P2R, and DC power P2 is supplied to distribution line L2.

As described above, in the present first embodiment, since DC powers P1 and P2 are supplied to distribution lines L1 and L2 such that the efficiency η of converters 4 and 7 is maximized, the efficiency of the system as a whole can be enhanced.

Furthermore, since DC voltage VA on distribution line L1 is controlled such that power consumption (or current consumption) of loads A1 and A2 is minimized, and DC voltage VB on distribution line L2 is controlled such that power consumption (or current consumption) of loads B1 and B2 is minimized, an optimum DC voltage for each kind of loads can be supplied.

In the present first embodiment, a pair of power generation and storage source 11 and converter 7 is provided. However, a plurality of pairs of power generation and storage source 11 and converter 7 may be provided. When a plurality of pairs of power generation and storage source 11 and converter 7 are provided, operating information detector 8 and power controller 9 are provided for each pair. Alternatively, one power controller 9 may be provided in common to a plurality of converters 7.

Second Embodiment

In the first embodiment, voltage controller 3 changes each of output voltages VA and VB of converter 4 to an optimum value such that power consumption (or current consumption) of loads A1, A2, B1, and B2 is reduced. When DC voltages VA and VB change, power consumption (or current consumption) of loads A1, A2, B1, and B2 changes, and voltage controller 3 further changes output voltages VA and VB of converter 4. When output voltages VA and VB of converter 4 change, the output power of converter 4 changes and the efficiency η1 of converter 4 changes (FIG. 3).

Furthermore, power controller 9 determines the efficiency η of converters 4 and 7 based on operating information D1 and D2 of converters 4 and 7 and changes output powers P1 and P2 of converter 7 such that the efficiency η thereof decreases. Therefore, if power controller 9 changes output powers P1 and P2 of converter 7 when voltage controller 3 changes output voltages VA and VB of converter 4, power controller 9 may be affected by voltage controller 3 and cause malfunction. The present second embodiment is intended to solve this problem.

Figure 8:
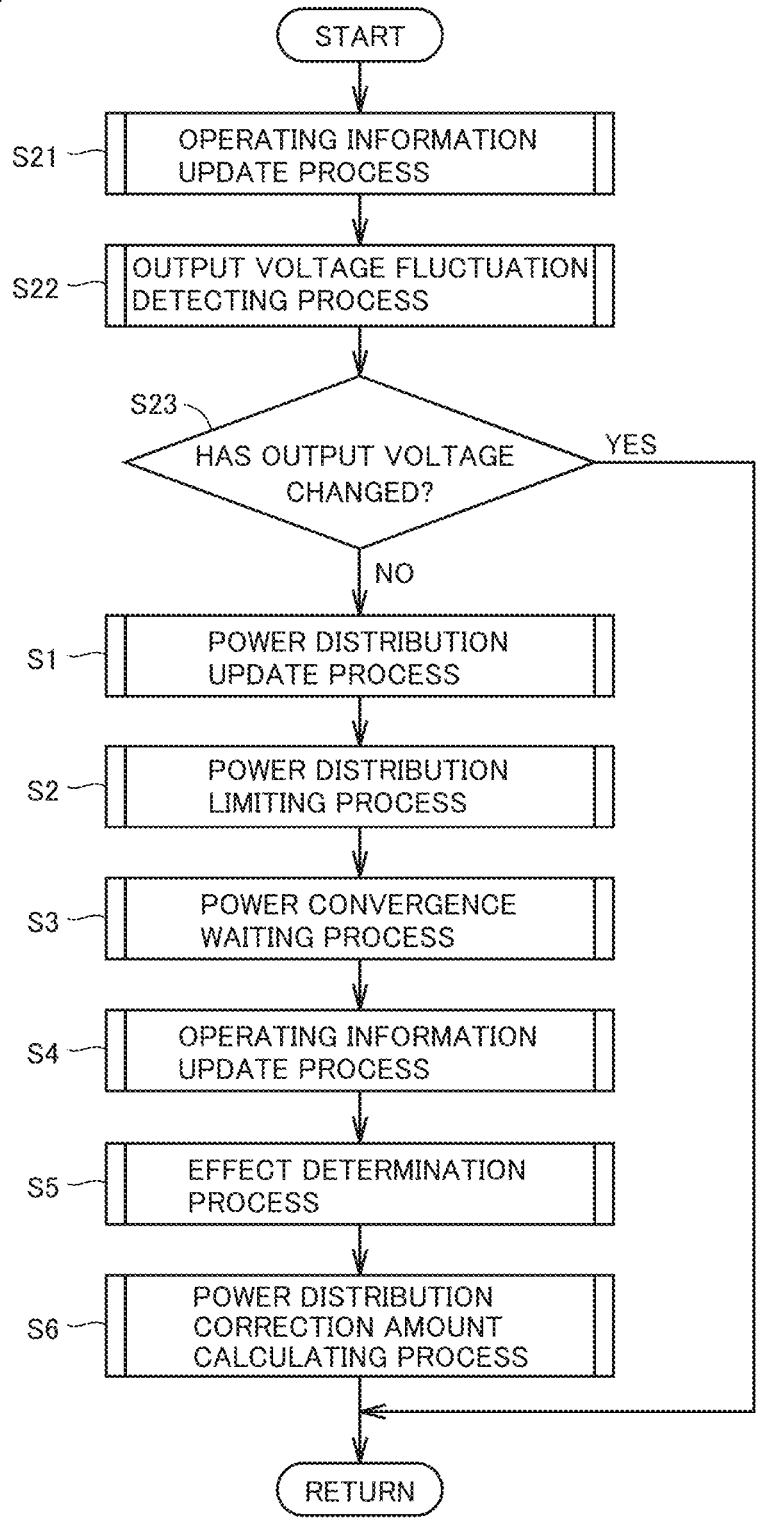
FIG. 8 is a flowchart showing the operation of the power distribution controller included in the DC power supply and distribution system according to a second embodiment.

FIG. 8 is a flowchart showing the operation of power distribution controller 42 included in the DC power supply and distribution system according to the second embodiment, in comparison with FIG. 6. Referring to FIG. 8, the present second embodiment differs from the first embodiment in that steps S21 to S23 are added before step S1.

At step S21, power distribution controller 42 performs an operating information update process. In this process, power distribution controller 42 acquires operating information D1 and D2 of converters 4 and 7 from operating information detectors 5 and 8 and stores the acquired operating information D1 and D2 into storage 43. In doing so, power distribution controller 42 stores the operating information D1 and D2 this time at an address different from that of the previous operating information D1 and D2 already stored.

At step S22, power distribution controller 42 performs an output voltage fluctuation detecting process. In this process, power distribution controller 42 reads the previous output voltages VAn and VBn and the output voltages VA(n+1) and VB(n+1) this time from storage 43 and determines deviations ΔVA=VA(n+1)−Van and ΔVB=VB(n+1)−VBn between the output voltages VA(n+1) and VB(n+1) this time and the previous output voltages VAn and VBn.

At step S22, when at least one of the absolute value of ΔVA and the absolute value of ΔVB exceeds a setting value, power distribution controller 42 determines that output voltages VA and VB have changed, and when both of the absolute value of ΔVA and the absolute value of ΔVB are smaller than the setting value, power distribution controller 42 determines that output voltages VA and VB have not changed.

At step S23, if it is determined that output voltages VA and VB have not changed, the process proceeds to step S1. At step S23, if it is determined that output voltages VA and VB have changed, the process returns to step S21. The other configuration and operation are the same as those of the first embodiment and a description thereof will not be repeated.

In the present second embodiment, since output powers P1 and P2 of converter 7 are not controlled until change of output voltages VA and VB of converter 4 disappears, malfunction of power controller 9 affected by voltage controller 3 can be prevented.

A synchronization signal may be used to prevent overlapping of a period of time in which voltage controller 3 operates and a period of time in which power controller 9 operates. According to this method, however, when the distance between the installation place of voltage controller 3 and the installation place of power controller 9 is long, a signal line for transmitting/receiving the synchronization signal between voltage controller 3 and power controller 9 is long, resulting in a price increase of the signal line or deterioration of the synchronization signal. By contrast, in the present second embodiment, there is no such concern even when the distance between the installation place of voltage controller 3 and the installation place of power controller 9 is long.

Third Embodiment

In the first embodiment, the operating information of converters 4 and 7 is detected by operating information detectors 5 and 8, and output powers P1 and P2 of converter 7 are controlled based on the detection results. However, when the distance between the installation place of converter 7 and the installation place of converter 4 is long, there is a possibility that the operating information of converter 4 is unable to be used. Then, in the present third embodiment, a method of performing power distribution control of converter 7 without using the operating information of converter 4 will be described.

Figure 9:
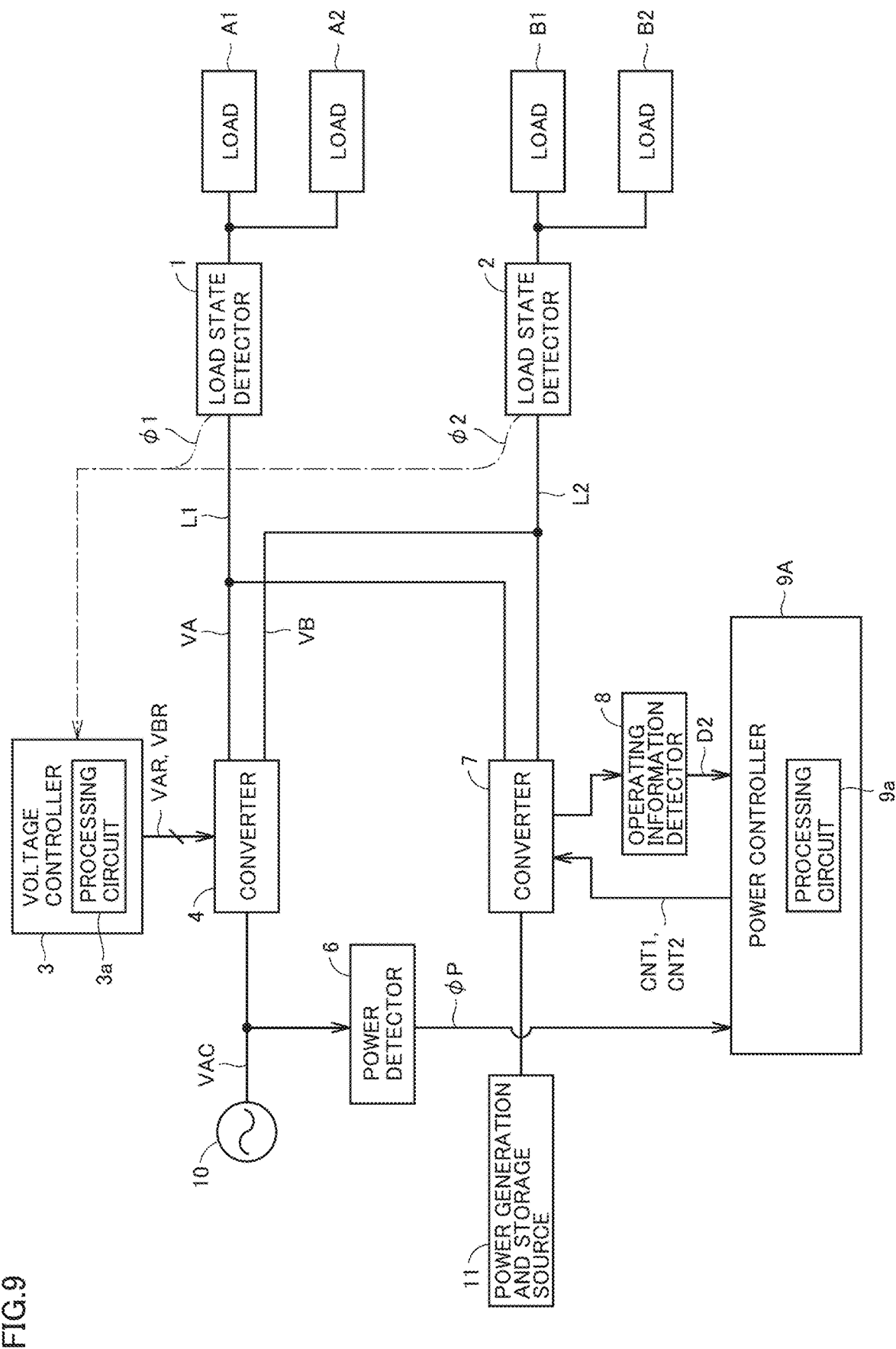
FIG. 9 is a block diagram showing a configuration of the DC power supply and distribution system according to a third embodiment.

FIG. 9 is a block diagram showing a configuration of the DC power supply and distribution system according to the third embodiment, in comparison with FIG. 1. Referring to FIG. 9, this DC power supply and distribution system differs from the DC power supply and distribution system in FIG. 1 in that operating information detector 5 is removed and power controller 9 is replaced by a power controller 9A.

Figure 10:
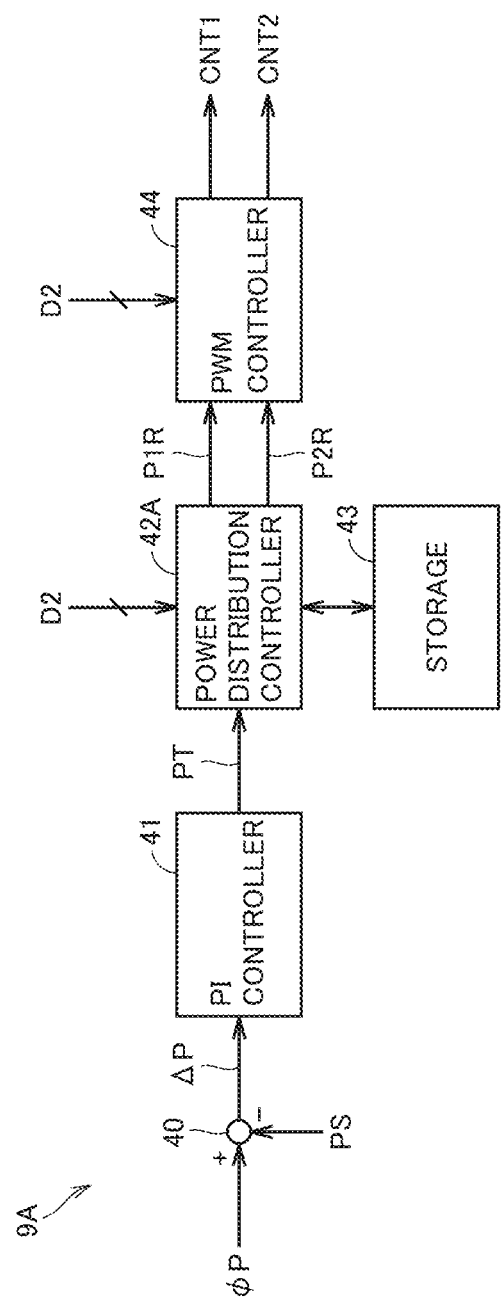
FIG. 10 is a circuit block diagram showing a configuration of the power controller shown in FIG. 9.

FIG. 10 is a block diagram showing a configuration of power controller 9A, in comparison with FIG. 4. Referring to FIG. 10, power controller 9A differs from power controller 9 in FIG. 4 in that power distribution controller 42 is replaced by a power distribution controller 42A. Power distribution controller 42A generates reference powers P1R and P2R such that the efficiency η1 of converter 4 is maximized, based on output power target value PT, in a range in which the efficiency η2 of converter 7 is greater than a lower limit value ηL.

That is, the relation among output power target value PT corresponding to the sum of output powers P1 and P2 of converter 7, a proportional constant Gpi of PI controller 41, AC power P supplied from commercial AC power source 10 to converter 4, and purchase power setting value PS that is the upper limit value of AC power P is represented by the following Equation (1).

$$PT = G_{pi} \times (P - PS) \geq 0 \tag{1}$$

Furthermore, the relation among AC power P, the sum PLD of power consumption of loads A1, A2, B1, and B2, power loss PL1 of converter 4, and the sum PO2=P1+P2 of output powers P1 and P2 of converter 7 is represented by the following Equation (2).

$$P=PLD+PL1-PO2 \quad (2)$$

The following Equation (3) is derived from the above Equations (1) and (2).

$$PT=Gpi(PLD+PL1-PO2-PS) \quad (3)$$

Equation (3) indicates that output power target value PT of converter 7 is proportional to power loss PL1 of converter 4. Therefore, in the power distribution control described in the first embodiment, in a case where the distribution of output powers P1 and P2 is controlled while the sum PO2=P1+P2 of output powers P1 and P2 is kept at a certain value, when power loss PL1 of converter 4 increases or decreases, output power target value PT increases or decreases.

Therefore, controlling the distribution of output powers P1 and P2 based on the increase/decrease of output power target value PT can minimize power loss PL1 of converter 4 and maximize the efficiency $\eta 1$ of converter 4.

However, even when the efficiency of converter 4 is the maximum value, if the efficiency $\eta 2$ of converter 7 is an extremely small value, the efficiency of the DC power supply and distribution system as a whole is reduced. Then, in the present third embodiment, power loss PL1 of converter 4 is minimized in a range in which the efficiency $\eta 2$ of converter 7 is greater than lower limit value $\eta L$.

Figure 11:
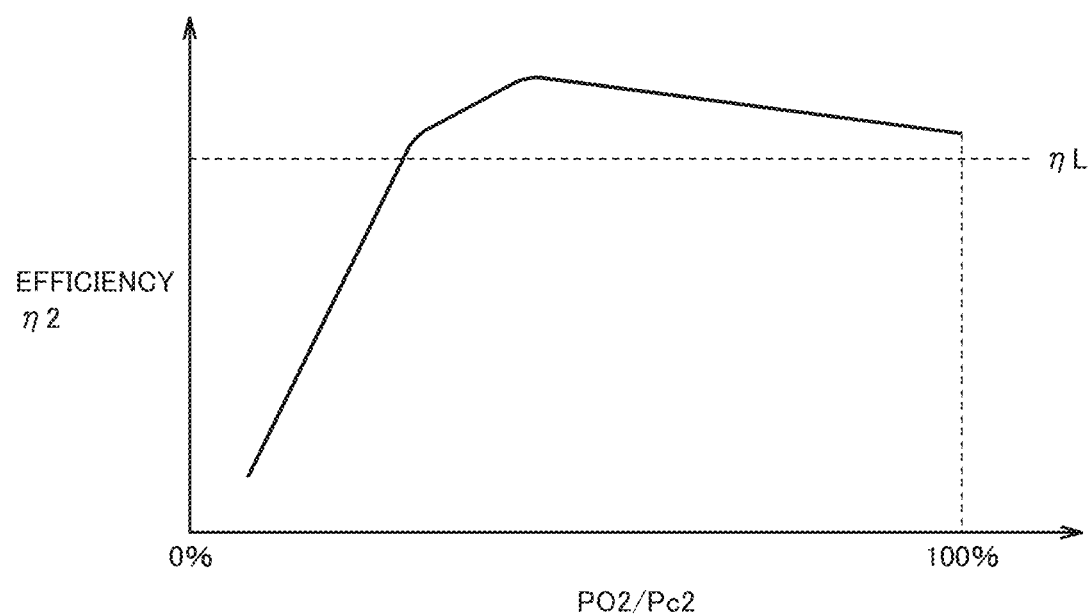
FIG. 11 is a diagram showing the efficiency of converter 7 shown in FIG. 9.

FIG. 11 is a diagram showing the efficiency $\eta 2$ of converter 7. In FIG. 11, the horizontal axis shows the ratio PO2/Pc2 (%) of output power PO2 to rated power Pc2 of converter 7, and the vertical axis shows the efficiency $\eta 2$. The efficiency $\eta 2$ changes in accordance with the value of PO2/Pc2 and reaches a peak value when PO2/Pc2 is a certain value. The efficiency $\eta 2$ gradually decreases as PO2/Pc2 increases from a certain value. The efficiency $\eta 2$ rapidly decreases as PO2/Pc2 decreases from a certain value. Lower limit value $\eta L$ is set for the efficiency $\eta 2$ of converter 7. Lower limit value $\eta L$ is set to, for example, a value slightly smaller than the efficiency $\eta 2$ when PO2/Pc2=100 (%).

Figure 12:
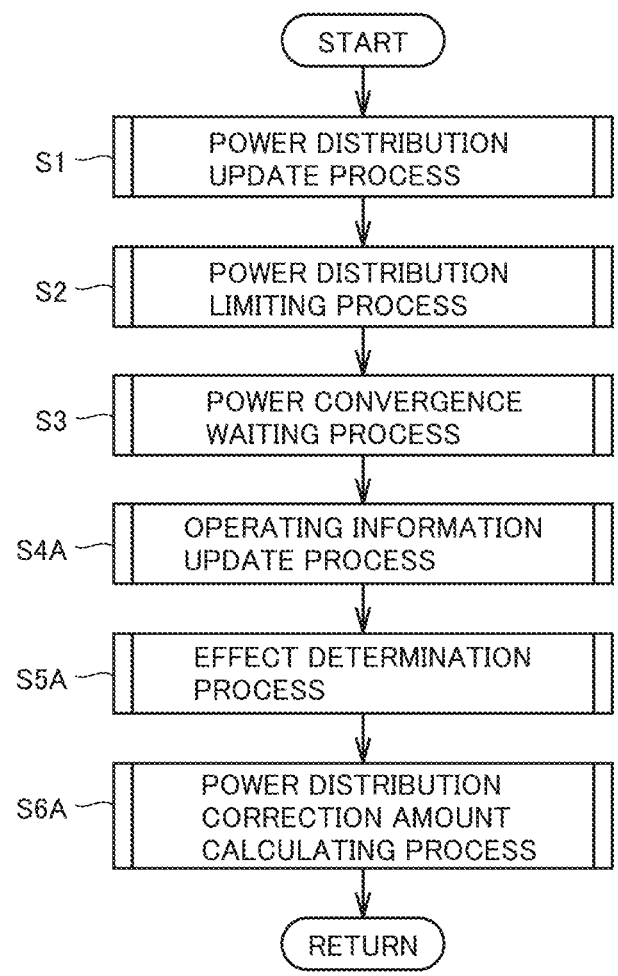
FIG. 12 is a flowchart showing the operation of the power distribution controller shown in FIG. 10.

FIG. 12 is a flowchart showing the operation of power distribution controller 42A, in comparison with FIG. 6. FIG. 12 differs from FIG. 6 in that steps S4 to S6 are replaced by steps S4A to S6A, respectively.

At step S4A, power distribution controller 42A performs an operating information update process. In this process, power distribution controller 42A acquires output power target value PT from PI controller 41 (FIG. 10) and stores the acquired output power target value PT into storage 43. In doing so, power distribution controller 42 stores the output power target value PT(n+1) this time at an address different from that of the previous output power target value PTn already stored.

Furthermore, power distribution controller 42A acquires operating information D2 of converter 7 from operating information detector 8 and stores the acquired operating information D2 into storage 43, and determines the efficiency $\eta 2(n+1)$ of converter 7 based on this operating information D2 and stores the determined efficiency $\eta 2(n+1)$ into storage 43. In doing so, power distribution controller 42A stores the operating information D2 and the efficiency $\eta 2(n+1)$ this time at an address different from that of the previous operating information D2 and efficiency $\eta 2n$ already stored.

At step S5A, power distribution controller 42A performs an effect determination process. In this process, power distribution controller 42A determines whether the efficiency $\eta 2(n+1)$ of converter 7 is greater than lower limit value $\eta L$ [$\eta 2(n+1) > \eta L$], whether the efficiency $\eta 2(n+1)$ of converter 7 is equal to lower limit value $\eta L$[$\eta 2(n+1) = \eta L$], and whether the efficiency $\eta 2(n+1)$ of converter 7 is smaller than lower limit value $\eta L$[$\eta \eta 2(n+1) < \eta L$].

Furthermore, power distribution controller 42A compares the previous output power target value PTn with the output power target value PT(n+1) this time and determines whether output power target value PT has lowered [PT(n+1)<PTn], whether output power target value PT has not changed [PT(n+1)=PTn], and whether output power target value PT has risen [PT(n+1)>PTn].

At step S6A, power distribution controller 42A performs a power distribution correction amount calculating process. In this process, in a case where efficiency $\eta 2(n+1)$ of converter 7 is greater than lower limit value $\eta L$[$\eta 2(n+1) > \eta L$] and the efficiency $\eta 2(n+1)$ of converter 7 is equal to lower limit value $\eta L$[$\eta 2(n+1) = \eta L$], when output power target value PT has lowered [PT(n+1)<PTn] and when output power target value PT has not changed [PT(n+1)=PTn], power distribution controller 42A sets the power distribution correction amount $\Delta Rn$ before update as it is as the power distribution correction amount $\Delta R$ after update. The process then returns to step S1.

Furthermore, in a case where the efficiency $\eta 2(n+1)$ of converter 7 is greater than lower limit value $\eta L$[$\eta 2(n+1) > \eta L$] and the efficiency $\eta 2(n+1)$ of converter 7 is equal to lower limit value $\eta L$[$\eta 2(n+1) = \eta L$], when output power target value PT has risen [PT(n+1)>PTn], power distribution controller 42 reverses the polarity of the power distribution correction amount $\Delta Rn$ before update to generate the power distribution correction amount $\Delta R$ after update. The process then returns to step S1.

Furthermore, in a case where the efficiency $\eta 2(n+1)$ of converter 7 is smaller than lower limit value $\eta L$[$\eta 2(n+1) < \eta L$], power distribution controller 42 reverses the polarity of the power distribution correction amount $\Delta Rn$ before update to generate the power distribution correction amount $\Delta R$ after update, irrespective of output power target value PT. The process then returns to step S1.

By repeatedly performing steps S1 to S6A, reference powers P1R and P2R can be generated such that loss PL1 of converter 4 is minimized and the efficiency $\eta 1$ of converter 4 is maximized, in a range in which the efficiency $\eta 2$ of converter 7 is lower limit value $\eta L$ or greater. The other configuration and the operation are the same as those of the first embodiment and a description thereof will not be repeated.

In the present third embodiment, the power distribution control of converter 7 can be performed such that the efficiency $\eta 1$ of converter 4 is maximized, without using the operating information of converter 4.

Comparative Example 1

Figure 13:
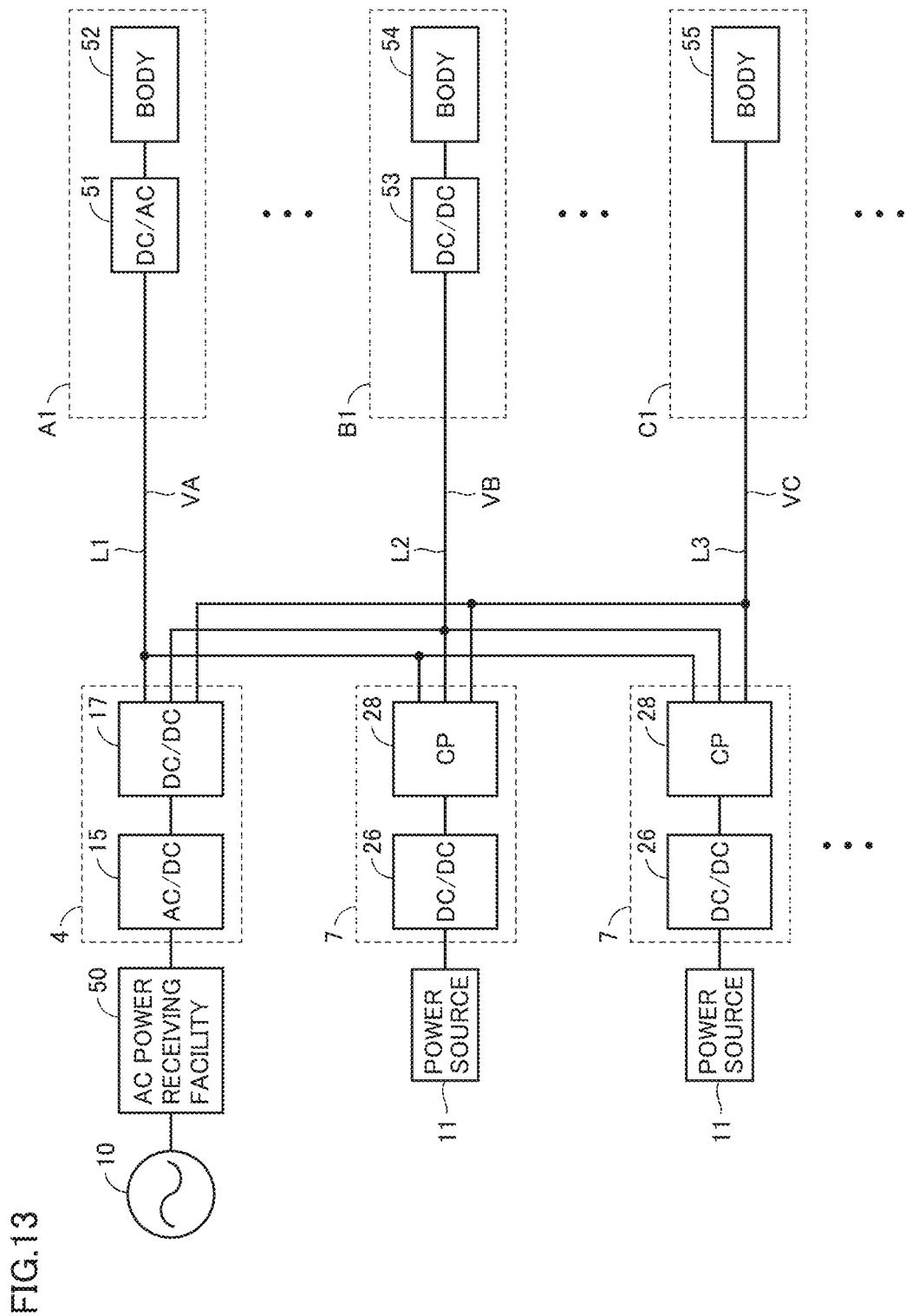
FIG. 13 is a block diagram showing Comparative Example 1 of the first to third embodiments.

FIG. 13 is a block diagram showing Comparative Example 1 of the first to third embodiments. In FIG. 13, the loads are divided into a plurality of (here, three) groups of different kinds. Loads A1, ... in group A are connected to distribution line L1. Load A1 includes a DC/AC converter 51 to convert DC voltage VA supplied through distribution line L1 into AC voltage and a body 52 driven by AC voltage supplied from DC/AC converter 51.

Load B1, . . . in group B are connected to distribution line L2. Load B1 includes a DC/DC converter 53 to convert DC voltage VB supplied through distribution line L2 into a certain DC voltage and a body 54 driven by DC voltage supplied from DC/DC converter 53. Load C1, . . . in group C are connected to distribution line L3. Load C1 includes a body 55 driven by DC voltage VC supplied through distribution line L3.

An AC power receiving facility 50, for example, steps down AC voltage supplied from commercial AC power source 10 and applies the stepped-down voltage to converter 4. Converter 4 includes an AC/DC converter 15 to convert AC voltage supplied from AC power receiving facility 50 into DC voltage and a DC/DC converter 17 to convert DC voltage supplied from AC/DC converter 15 into three DC voltages VA, VB, and VC and supply the converted DC voltages VA, VB, and VC to distribution lines L1 to L3, respectively.

A plurality of pairs (in this example, two pairs) of converter 7 and power generation and storage source 11 are coupled to distribution lines L1 to L3. Converter 7 includes a DC/DC converter 26 to convert DC voltage supplied from power generation and storage source 11 into a certain DC voltage and a chopper circuit (CP) 28 to distribute DC power supplied from DC/DC converter 26 to three distribution lines L1 to L3.

In this Comparative Example 1, since the efficiency of converters 4 and 7 is not taken into consideration, and each of DC voltages VA, VB, and VC is kept at a certain value, irrespective of states of loads A1, B1, C1, . . . , the efficiency of the system as a whole is deteriorated compared with the first to third embodiments.

Comparative Example 2

Figure 14:
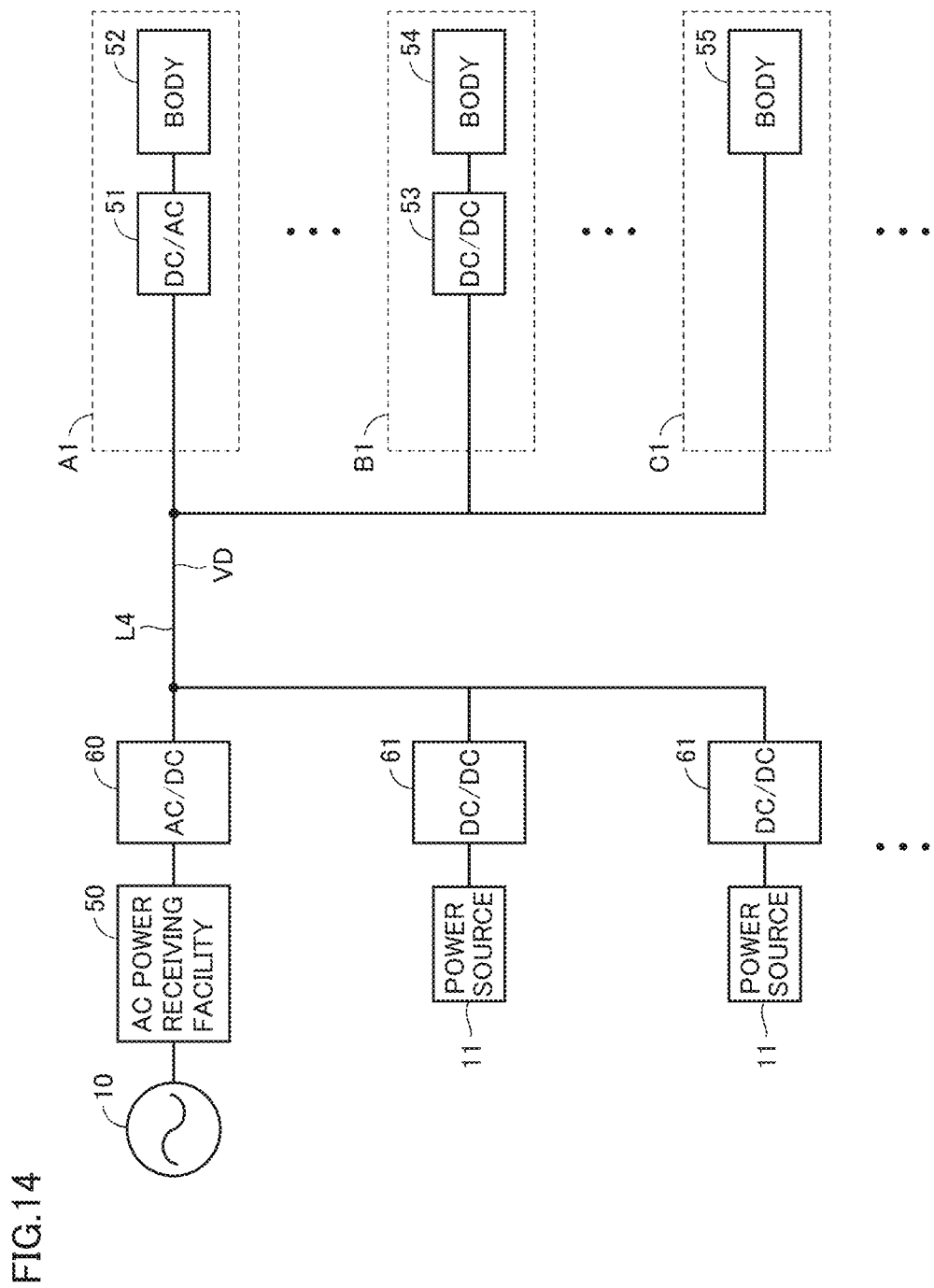
FIG. 14 is a block diagram showing another Comparative Example 2 of the first to third embodiments.

FIG. 14 is a block diagram showing another Comparative Example 2 of the first to third embodiments. In FIG. 14, in this DC power supply and distribution system, all of loads A1, B1, C1, . . . are connected to one distribution line L4. AC power receiving facility 50, for example, steps down AC voltage supplied from commercial AC power source 10 and applies the stepped-down voltage to AC/DC converter 60. AC/DC converter 60 converts AC voltage supplied from AC power receiving facility 50 into DC voltage VD, which is supplied to distribution line L4.

A plurality of pairs (in this example, two pairs) of DC/DC converter 61 and power generation and storage source 11 are coupled to distribution line L4. Each DC/DC converter 61 supplies DC voltage supplied from the corresponding power generation and storage source 11 into DC voltage VD, which is supplied to distribution line L4.

In this Comparative Example 2, since the efficiency of converters 60 and 61 is not taken into consideration and DC voltage VD is kept at a certain value, irrespective of states of loads A1, B1, C1, . . . , the efficiency of the system as a whole is deteriorated compared with the first to third embodiments.

Comparative Example 3

Figure 15:
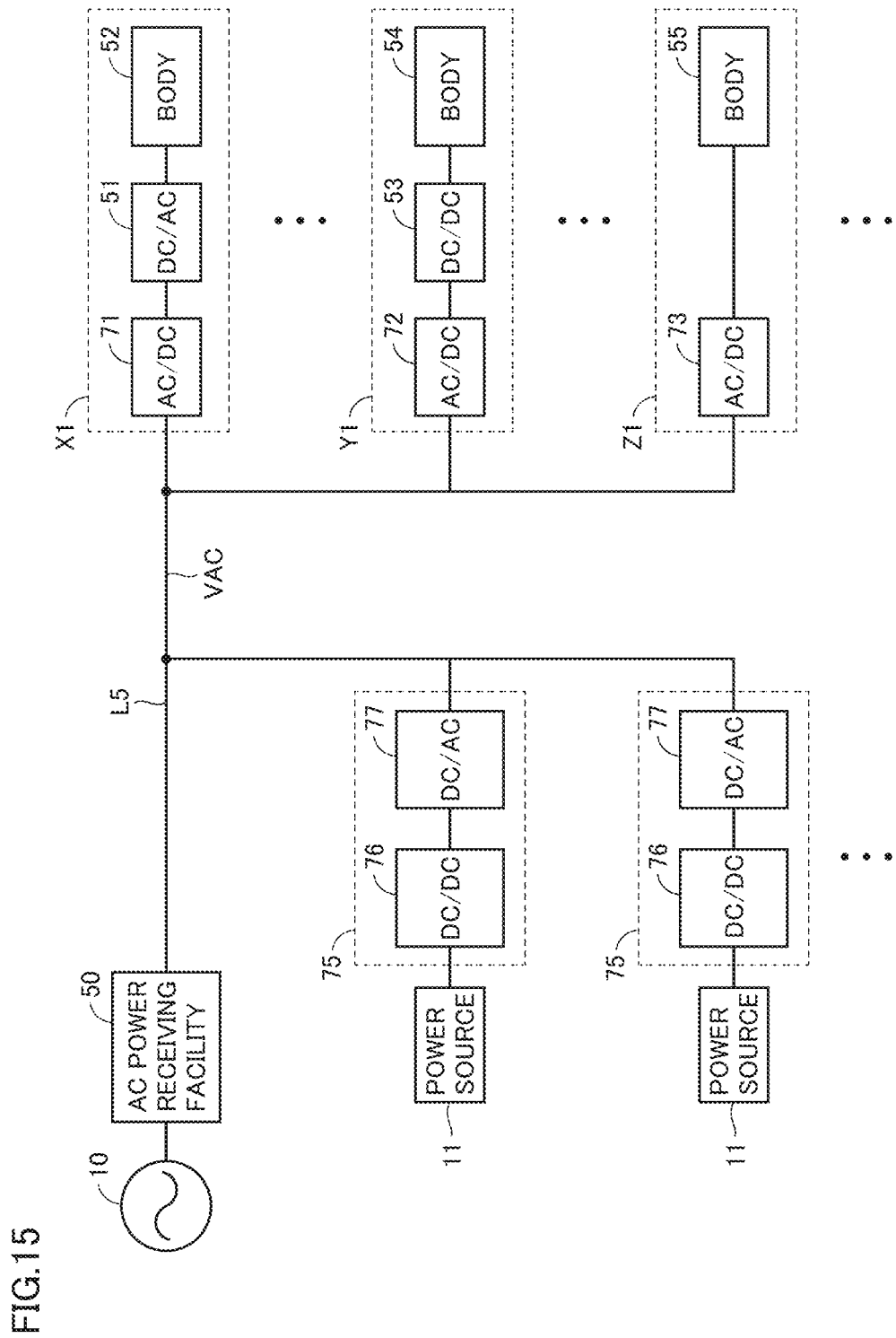
FIG. 15 is a block diagram showing another Comparative Example 3 of the first to third embodiments.

FIG. 15 is a block diagram showing another Comparative Example 3 of the first to third embodiments. In FIG. 15, in this AC transmission and distribution system, all of loads X1, Y1, Z1, . . . are connected to one distribution line L5.

Load X1 includes an AC/DC converter 71 to convert AC voltage VAC supplied through distribution line L5 into DC voltage, a DC/AC converter 51 to convert DC voltage supplied from AC/DC converter 71 into AC voltage, and a body 52 driven by AC voltage supplied from DC/AC converter 51.

Load Y1 includes an AC/DC converter 72 to convert AC voltage VAC supplied through distribution line L5 into DC voltage, a DC/DC converter 53 to convert DC voltage supplied from AC/DC converter 72 into a certain DC voltage, and a body 54 driven by DC voltage supplied from DC/DC converter 53. Load C1 includes an AC/DC converter 73 to convert AC voltage VAC supplied through distribution line L5 into DC voltage and a body 55 driven by DC voltage supplied from AC/DC converter 73.

AC power receiving facility 50, for example, steps down AC voltage supplied from commercial AC power source 10 and supplies the stepped-down voltage to distribution line L5. A plurality of pairs (in this example, two pairs) of converter 75 and power generation and storage source 11 are coupled to distribution line L5. Converter 75 includes a DC/DC converter 76 to convert DC voltage supplied from power generation and storage source 11 into a certain DC voltage and a DC/AC converter 77 to convert DC power supplied from DC/DC converter 76 into AC voltage VAC and supply AC voltage VAC to distribution line L5.

In this Comparative Example 3, since the efficiency of converter 75 is not taken into consideration and AC voltage VAC is kept at a certain value, irrespective of states of loads X1, Y1, Z1, . . . , the efficiency of the system as a whole is deteriorated compared with the first to third embodiments.

FIG. 16 is a table for comparing the number of converter stages in Comparative Examples 1 to 3. In FIG. 16, the main power path is a path that supplies power from commercial AC power source 10 to body 52 of the load. The sub-power path is a path that supplies power from power generation and storage source 11 to body 52 of the load. Here, it is assumed that loss increases in proportion to the number of converter stages. Furthermore, chopper circuit 28 is treated as a converter.

In Comparative Example 1, three stages of converters 15, 17, and 51 are provided on the main power path, and three stages of converters 26, 28, and 51 are provided on the sub-power path. In Comparative Example 2, two stages of converters 60 and 51 are provided on the main power path, and two stages of converters 61 and 51 are provided on the sub-power path. In Comparative Example 3, two stages of converters 71 and 51 are provided on the main power path, and four stages of converters 76, 77, 71, and 51 are provided on the sub-power path.

In Comparative Example 3, since the number of converter stages on the main power path is as small as two stages but the number of converter stages on the sub-power path is as large as four stages, loss in the converters is increased when power generation and storage source 11 such as solar cells is actively utilized.

In Comparative Example 2, the number of converter stages on the main power path is two stages and equivalent to that in Comparative Example 3, and the number of converter stages on the sub-main path is two stages, two stages fewer than Comparative Example 3. This configuration is advantageous in terms of efficiency when power generation and storage source 11 is actively utilized. However, the loads include no AC/DC converter, and therefore, when various kinds of loads are included, the optimum DC voltage of DC/AC converter 51 included in a load may vary from load to load. This prevents supply of an optimum DC voltage for each load and may deteriorate the load efficiency.

In Comparative Example 1, the loads are divided into a plurality of groups, a plurality of distribution lines are provided corresponding to a plurality of groups, and DC voltage is supplied for each group. This configuration therefore can eliminate the problem in Comparative Example 2 in which the load efficiency is deteriorated.

Furthermore, in Comparative Example 1, the number of converter stages on the main power path is three, which is one stage more than Comparative Example 3, and the number of converter stages on the sub-main path is three, which is one stage fewer than Comparative Example 3. Therefore, as for the number of converter stages, compared with Comparative Example 3, Comparative Example 1 is a disadvantageous configuration in terms of efficiency in power transmission from commercial AC power source 10 to the loads and is an advantageous configuration in terms of efficiency in power transmission from power generation and storage source 11 to the loads.

The problem of Comparative Example 1 is therefore to eliminate deterioration of efficiency due to increase in number of converter stages on the main power path. The present first to third embodiments solve the problem to Comparative Example 1 by controlling the output power of converter 7 such that the efficiency η of converters 4 and 7 is maximized and thereby suppressing deterioration of the efficiency due to increase in number of converter stages.

Embodiments disclosed here should be understood as being illustrative rather than being limitative in all respects. The present invention is shown not in the foregoing description but in the claims, and it is intended that all modifications that come within the meaning and range of equivalence to the claims are embraced here.

REFERENCE SIGNS LIST

A1, A2, B1, B2, C1 load, L1 to L3 distribution line, 1, 2 load state detector, 3 voltage controller, 3a, 9a processing circuit, 4, 7, 75 converter, 5, 8 operating information detector, 6 power detector, 9, 9A power controller, 10 commercial AC power source, 11 power generation and storage source, 15, 60, 71 to 73 AC/DC converter, 16, 27 capacitor, 17, 26, 53, 61, 76 DC/DC converter, 20 to 22, 30 to 32 voltage detector, 23 to 25, 33 to 35 current detector, 28 chopper circuit, 40 subtractor, 41 PI controller, 42, 42A power distribution controller, 43 storage, 44 reference current generator, 50 AC power receiving facility, 51, 77 DC/AC converter, 52, 54, 55 body.

The invention claimed is:

1. A DC power supply and distribution system comprising:
a plurality of distribution lines provided respectively corresponding to a plurality of loads;
a first converter to convert a voltage supplied from a first power source into a plurality of DC voltages respectively corresponding to the plurality of loads and simultaneously output the plurality of DC voltages respectively to the plurality of distribution lines;
a second converter to convert a power supplied from a second power source into a plurality of DC powers respectively corresponding to the plurality of loads and simultaneously output the plurality of DC powers respectively to the plurality of distribution lines; and
a first controller to supply control signals to the second converter to control the plurality of DC powers output to the plurality of distribution lines such that efficiency of the first converter is increased, based on information related to efficiency of the second converter,
wherein the DC power supply and distribution system further comprises a power detector to detect a power supplied from the first power source,
wherein the first controller provides the control signals to the second converter to control a sum of the plurality of DC powers such that a power value detected by the power detector is smaller than a predetermined value, and
the first controller:
generates an output power target value having a magnitude corresponding to a deviation between the power value detected by the power detector and the predetermined value, and
supplies the control signals to the second converter to control the plurality of DC powers such that the sum of the plurality of DC powers attains the output power target value and that the output power target value decreases.

2. The DC power supply and distribution system according to claim 1, wherein the first controller provides the control signals to the second converter to control the plurality of DC powers such that the efficiencies of the first and second converters are increased, based on information related to the efficiency of the second converter and information related to the efficiency of the first converter.

3. The DC power supply and distribution system according to claim 2, further comprising:
a first detector to detect information related to the efficiency of the second converter; and
a second detector to detect information related to the efficiency of the first converter,
wherein the first controller provides the control signals to the second converter to control the plurality of DC powers, based on detection results of the first and second detectors.

4. The DC power supply and distribution system according to claim 1, wherein
for the plurality of DC powers, respective upper limit values are predetermined, and
the first controller provides the control signals to the second converter to control a magnitude of each of the plurality of DC powers such that the plurality of DC powers do not exceed the respective upper limit values.

5. The DC power supply and distribution system according to claim 1, further comprising:
a plurality of load state detectors to respectively detect states of the plurality of loads; and
a second controller to control a magnitude of each of the plurality of DC voltages such that power consumption of each of the plurality of loads is minimized, based on detection results of the load state detectors.

6. The DC power supply and distribution system according to claim 5, wherein the first controller does not provide control signals to the second converter to control the plurality of DC powers when a magnitude of at least one DC voltage among the plurality of DC voltages is changing.

7. The DC power supply and distribution system according to claim 1, wherein the first power source is a commercial AC power source or a DC power source, and the second power source is a power generation and storage source to output DC power.

8. The DC power supply and distribution system according to claim 7, wherein the power generation and storage source includes solar cells, wind power generators, tidal power generators, geothermal power generators, or fuel cells.

9. The DC power supply and distribution system according to claim 1, wherein the plurality of DC voltages supplied by the first converter are different.

10. The DC power supply and distribution system according to claim 1, wherein the plurality of loads are divided into different types and loads of a same type are connected to a same one of the plurality of distribution lines.

11. The DC power supply and distribution system according to claim 10, wherein loads of different types are connected to different ones of the plurality of distribution lines.

12. The DC power supply and distribution system according to claim 1, wherein, after supplying the control signals to the second converter to control the plurality of DC powers, the first controller is configured to
perform a power convergence waiting process to allow the plurality of DC powers to converge to a stable value,
acquire updated information related to the efficiency of the first converter and updated information related to the efficiency of the second converter,
determine whether efficiency of at least the first converter has increased, and
adjusts the control signals to the second converter to control the plurality of DC powers based on the determination of whether the efficiency of at least the first converter has increased.

13. The DC power supply and distribution system according to claim 12, wherein the power convergence waiting process includes waiting for expiration of a timer.

14. The DC power supply and distribution system according to claim 12, wherein the power convergence waiting process includes detecting whether values of the plurality of DC powers have become constant over time.

15. The DC power supply and distribution system according to claim 14, wherein the power convergence waiting process further includes a timeout process to identify the plurality of DC powers as having converged even if at least some of the plurality of DC powers continue to vary over time.

16. The DC power supply and distribution system according to claim 1, wherein the first controller includes a pulse-width modulation (PWM) controller to set a duty cycle of the control signals to the second converter to control the plurality of DC powers.

* * * * *